(12) United States Patent
Wang et al.

(10) Patent No.: US 8,060,818 B2
(45) Date of Patent: Nov. 15, 2011

(54) METHOD AND APPARATUS FOR FORM ADAPTATION

(75) Inventors: Wei Wang, Chengdu (CN); Yun Ling, Chengdu (CN); Yuangui Li, Chengdu (CN)

(73) Assignee: SAP AG, Walldorf (DE)

( * ) Notice: Subject to any disclaimer, the term of this patent is extended or adjusted under 35 U.S.C. 154(b) by 995 days.

(21) Appl. No.: 12/002,074

(22) Filed: Dec. 14, 2007

(65) Prior Publication Data
US 2009/0158134 A1    Jun. 18, 2009

(51) Int. Cl.
*G06F 17/00* (2006.01)
(52) U.S. Cl. ............... 715/221; 715/235; 715/243
(58) Field of Classification Search .............. 715/221, 715/235, 243
See application file for complete search history.

(56) References Cited

U.S. PATENT DOCUMENTS

| | | | |
|---|---|---|---|
| 5,267,155 A * | 11/1993 | Buchanan et al. | 715/210 |
| 7,334,216 B2 * | 2/2008 | Molina-Moreno et al. | 717/109 |
| 7,406,660 B1 * | 7/2008 | Sikchi et al. | 715/236 |
| 7,415,664 B2 * | 8/2008 | Aureglia et al. | 715/212 |
| 2006/0279566 A1 * | 12/2006 | Atkins et al. | 345/418 |

OTHER PUBLICATIONS

Vander Zanden, et al., "Using Model Dataflow Graphs to Reduce the Storage Requirements of Constraints" ACM Transactions on Computer-Human Interaction, vol. 8, No. 3, Sep. 2001, pp. 223-265.*

* cited by examiner

*Primary Examiner* — Amelia Rutledge
(74) *Attorney, Agent, or Firm* — Mintz, Levin, Cohn, Ferris, Glovsky & Popeo, P.C.

(57) ABSTRACT

A method and an apparatus for retrieving a form template including one or more rendering attributes for rendering one or more partitions of a form are described. Whether the partitions of the form can be rendered in compliance with style constraints is determined according to the rendering attributes. An updated form template is generated such that at least one of the rendering attributes is updated. Partitions of the form can be rendered based on the updated template in compliance with the style constraints.

18 Claims, 18 Drawing Sheets

800a

| Building Block | Components | Attributes | Constraints |
|---|---|---|---|
| | Header | | |
| | | Form TitlePosition | H 0mm V 14mm from top margin to top of text field |
| | | Maximal Length | "80.0mm" |
| | | Font Family | Arial |
| | | ... | |
| | Logo | Width | "40.0mm" |
| | | Height | "20.0mm" |
| | | Resizable to fit image | No |
| | | Position | "H 130.0mm V 0mm fro margins" |
| | Graphic element as Separator | Shape | "Rectangular bar, half filled" |
| | | Height | "2.5mm" |
| | | Line width | "Left half no filling and border 0.35mm, right half filled" |
| | | Width | "190.0mm" |
| | | Line color ... | |
| | | Fill Color ... | |
| | | Position ... | |
| Address Block | Content | | |
| | | Width (when 1 Info Block) | "82.0mm" |
| | | Width (when 2 Info Blocks) | "52.0mm"  ← 801 |
| | | Height | Same as Info Block |
| | | Line spacing | "Each text field is 5.0mm height with bottom margin 1.2mm" |
| | | Font size Sender Address | 8pt |
| | | Font size Receiver Address | 10pt |
| | | Font Family | Arial |
| | | ... | |
| Info Block | | "Font(size, family and type) for caption" | "Arial, 10pt Bold" |
| | | "Font(size, family and type) for content" | "Arial, 10pt Regular" |
| | | Line Height | "Each text field is 5.0mm height with bottom margin 1.2mm" |
| | | "width, when 1 Info Block" | "82.0mm" |
| | | "width, when 2 Info Blocks" | "52.0mm for each Block" |
| | | Field Alignment | Align to the left and all the lines including page number should be left aligned to same X-axis position |
| | | Height | "3.0mm" |
| | | Horizontal Spacing to address Block and/or another Info Block | ...  ← 809 |
| | | Page number's vertical spacing to other fields | ... |
| | | Vertical Spacing to Header | ... |
| | | Height of Blank Lin | ... |
| Content Area | | Vertical spacing to info block | "6.0mm" |
| Free Text Block | Static text part | "font(size, type, family)" | "Arial, 10pt, Regular" |
| | | Alignment | Left |
| | | Line Spacing | Single line |
| | | Size | "Width 170.pt, height variable" |
| | Dynamic text part | "font(size, type, family)" | "Arial, 10pt, Regular" |
| | | Highlight(can't highlight with background) | "Arial, 10pt, Bold" |
| | | Position | "6.0 mm to info block (0mm to the top of Content block)" |

| Building Block | Components | Attributes | Constraints |
|---|---|---|---|
| Table | Title | "Font(size, type and family)" | "Arial, 12pt, Bold" |
| | | Position | "H 0mm V 2,0mm from Block above" |
| | | Alignment | Left |
| | | Title position | H 0mm (left aligned with the Table border) |
| | | Title size of text block | "H 15.0mm V 8.0mm, margins L 0mm, T+B+R 1,0mm" |
| | table border | Size | "All-round 0.18mm" |
| | | Color | "RGB 192, 192, 192" |
| | Tabel header | Bottom Border | "0,18mm, no cell separators" |
| | | Color | "RGB 192, 192, 192" |
| | | Padding from border to text | "Top 1.0mm, bottom 1.0mm, left 1.0mm, right 1.0mm" |
| | | Cell | Maximal cell width |
| | Content Row | Column separators | "Vertical only 0.18mm" |
| | | Separator color | "RGB 192, 192, 192" |
| | | Padding from border to text | "Top 1.0mm, bottom 1.0mm, left 1.0mm, right 1.0mm" |
| | | Cell | Maximal cell width |
| | | ... | |
| | | Font ... | |
| | | Alignment... | |
| | | Background color ... | |
| | | Whether even and odd row with different background? | ... |
| | | Cell/Column highlighting | ... |
| | Overflow trailer | Text | defined by Globalization team |
| | | position | align to the right border of the table |
| | | "Font(size, type and family)" | "Arial, 8pt, regular" |
| | | Alignmentright | Right |
| | | Text field margins | "0.5mm all sides" |
| | Notes or Remark Row | Border | Same as Content Row |
| | | "Font(size, type and family) for caption" | "default: Arial, 10pt, bold" |
| | | "Font(size, type and family) for content" | "default: Arial, 10pt, regular Warning: Arial, 10pt, bold" |
| | | background color  white | |
| | | position | left align to the second column |
| | | line spacing | 1mm (as in Content cell) |
| Summary Block | | Table position | "H 85.0mm, V 3.0mm to the table above, align to the right margin" |
| | | Table Alignment | "Align the summary block to the position of the Info Block in the case, when there are only 1 address block and 1 Info Blocks. Keep this position even if there are more Info Blocks on the form." |
| | Content Row | Border ... | |
| | | Cell margins Caption cell | ... |
| | | Alignment... | |
| | | Font ... | |
| | | Cell margins Value field cell | ... |
| | | Alignment... | |
| | | Font ... | |
| | | Cell border ... | |
| | | Cell height ... | |

| Building Block | Components | Attributes | Constraints | |
|---|---|---|---|---|
| Signature Block | | | | 800c |
| | Company Name | alignment<br>"Font (type, size and family)"<br>text field size<br>position<br>text field margins | Left<br>"Arial, 10pt, bold"<br>"height 5.0mm"<br>0mm from the Block above<br>"L+ T + B + R 1.0mm" | |
| | Contact Person | "Font (type, size and family)"<br>text field size<br>position<br>text field margins | "Arial, 10pt, regular"<br>"height 5.0mm"<br>0mm from the Block above<br>"L+ T + B + R 1.0mm" | |
| | Digital Signature | Size of picture<br>"Font (type, size and family)<br>    for caption"<br>position<br>margins<br>Is it allowed to be displayed<br>    on separate page? | "H 40.0mm V 20.0mm"<br><br>"Arial, 10pt, regular"<br>0mm from the Block above<br>L+ T + B + R 0mm<br><br>No | |
| Free Fields (not belong to a block) | | | | |
| | Static text field | "Font (type, size and family)"<br>maximal length<br>Text Alignment<br>border<br>background<br>Line spacing for multiple lines | "Arial, 10pt, regular"<br>"170.0mm"<br>H: Left V: Top<br>No<br>White<br>Single line | |
| | Note field | "Font(type, size and family)<br>    for content"<br>"Font(type, size and family)<br>    for caption"<br>Block Alignment<br><br>Text alignment<br>size<br>Margins<br>Appearance<br>border of caption<br>Position of caption<br>Reserve (caption position)<br>background<br>Text overflow | "Arial, 10pt, regular"<br><br>"Arial, 10pt, regular"<br>Aligned on the left with the Summary Block<br>    and on the right to the right margin<br>Left<br>"V 40.0mm"<br>L+T+B+R 0mm<br>Sunken box<br>no<br>Top Left above the edit box (as in Date)<br>4mm<br>White<br>Automatic scrollbar | 805 |
| | Date time field | "Font (type, size and family)<br>    for content"<br>"Font (type, size and family)<br>    for caption"<br>Text Alignment<br>Size<br>Margins ...<br>maximal length<br>Appearance<br>border caption<br>Reserve (caption position)<br>background | "Arial, 10pt, regular"<br><br>"Arial, 10pt, regular"<br>Left<br>"H 38.0mm V 12.0mm"<br><br>...<br>...<br>...<br>...<br>... | |
| | E-mail Field | "Font (type, size and family)<br>    for content"<br>"Font (type, size and family)<br>    for caption"<br>Text Alignment<br>maximal length<br>size<br>Margins ...<br>Appearance<br>border caption<br>Reserve (caption position)<br>background | "Arial, 10pt, regular"<br><br>"Arial, 10pt, regular"<br>Left<br>no limit<br>...<br><br>...<br>...<br>...<br>... | |

Fig. 8c

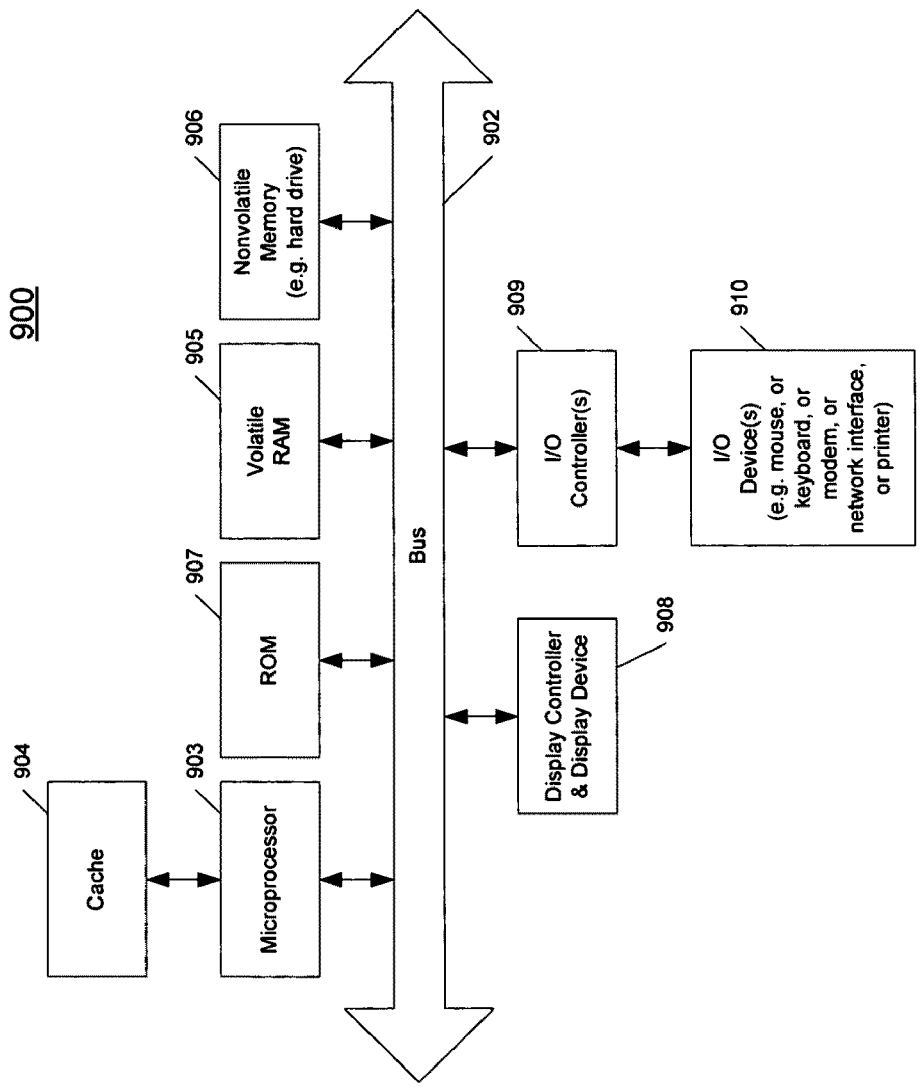

METHOD AND APPARATUS FOR FORM ADAPTATION

NOTICE OF COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

FIELD OF INVENTION

The present invention relates generally to document design. More particularly, this invention relates to adaptation of forms.

BACKGROUND

When designing electronic forms (or a form to be filled out on a computer) for similar business functions, it is a common practice to use templates for simplifying the design process. However, many electronic programs for form design either do not support templates for forms or rely on complicated yet limited template configuration mechanisms. For example, a form configuration tool based on XLST (Extensible Stylesheet Language Transformations) may require a designer to express form adaptation in XLST language. However, such a complicated process defies the purpose of form design by adapting an existing form.

Besides, many design platforms are not optimized to use an existing form as a template for generating other forms. Even if it is possible to adapt a form template in these design platforms, the adaptation process may be costly in both human and computing resources. As a result, the design cycle based on form adaptation may be prolonged and the approach becomes practically undesirable.

In addition, adapting or changing a template to derive new form designs may be subject to many design constraints or requirements, for example, design guidelines or styles depending on specific business needs. Often times, it is labor intensive and error prone to manually enforce such constraints or requirements when adapting a form. Therefore, existing methods for form adaptation may be inefficient, ineffective or even frustrating to use.

SUMMARY OF THE DESCRIPTION

The present invention includes a method and apparatus that retrieve a form template including one or more rendering attributes for rendering one or more partitions of a form. Whether the partitions of the form can be rendered in compliance with style constraints is determined according to the rendering attributes. Style constraints may be specified from a user interface or derived from pre determined style guides. An updated form template is generated such that at least one of the rendering attributes is updated. Partitions of the form can be rendered based on the updated template in compliance with the style constraints.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIGS. 8a-8c are examples of constraints for rendering attributes of a form template;

FIG. 9 illustrates one example of a computer system which may be used with one embodiment of the present invention.

DETAILED DESCRIPTION

A method and an apparatus for adapting form templates to generate forms are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

An embodiment for a system and a method is disclosed for adapting a form template as a markup text file according to a form style to generate forms. A form template may be adapted based on an associated markup text file which could be easily stored and retrieved without special platform requirements. A form template is presented as a hierarchical tree structure according to a document object model of the form template to facilitate traversing and updating the form template. User interfaces are generated based on a form template to guide an update process in an interactive and easy to follow manner. Form styles according to different business scenario are automatically incorporated by enforcing associated constraints on attributes of a form template. In one embodiment, a form style includes constraints for a form template. Updating a form style may be based on a user interface for a user to enter form constraints on the fly in a user friendly manner. Constraint violations are flagged via user interfaces including a hierarchical tree structure with explanation messages and suggested solution information. A document object model of a form template is automatically updated to satisfy constraints from associated form styles. An updated form template may be obtained by serializing an updated document object model, for example, to persistently store the updated form template.

Figure 1:
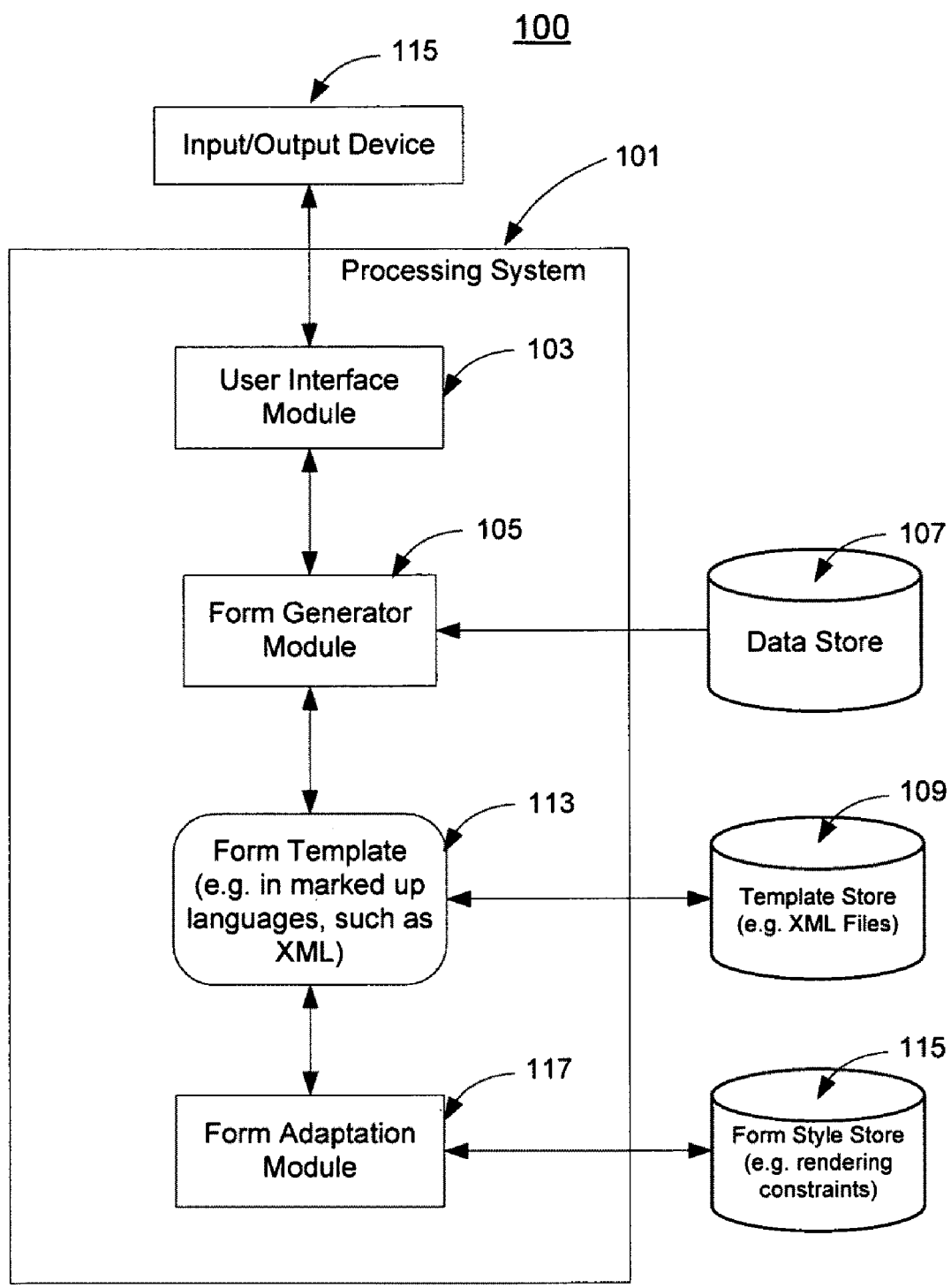
FIG. 1 is a block diagram illustrating one embodiment of a system that generates forms from adaptable form templates.

FIG. 1 a block diagram illustrating one embodiment of a system that generates forms from adaptable form templates. In one embodiment, a form template may be stored in a template store 109, such as a file server or a database. A processing system 101 may include a form generator module 105 to generate a form to be presented in an input/output device 115, such as a computer monitor or a printer, via a user interface module 103. A form generator module may retrieve business data from a data store 107 to combine with a form template 113, such as filling in parts of form fields of the form. Additionally, form data may be provided via a user interface module 103. Forms for different business scenarios such as, for example, a sale invoice, a client contact or a special format requirement from a vendor, may be generated based on form templates different in form contents and/or form styles.

A form template may be a text file in a markup language, such as an XML (Extended Markup Language) based file, adaptable to a variety of form contents and form styles. A form content may be a form building block, such as an address block, a header block, a logo block, or a footer block in a form. A form style may include rendering constraints for a form, such as the width and height for a form building block. In one embodiment, a form generator module 105 determines rendering parameters, such as layout positions for each form content, to render a form according to a form template 113. A form adaptation module 117 may update a form template 113 in compliance with rendering constraints stored in a form style store 115. In one embodiment, a form adaptation module 117 may receive adaptation requirements from a user interface which provides a user friendly guide for a user to customize form adaptation by the form adaptation module 117. A rendering constraint may be related to rendering attributes, such as, widths and/or heights of form building blocks. In one embodiment, a form adaptation module 117 and a form generator module 105 may be hosted by separate processing systems.

Figure 2:
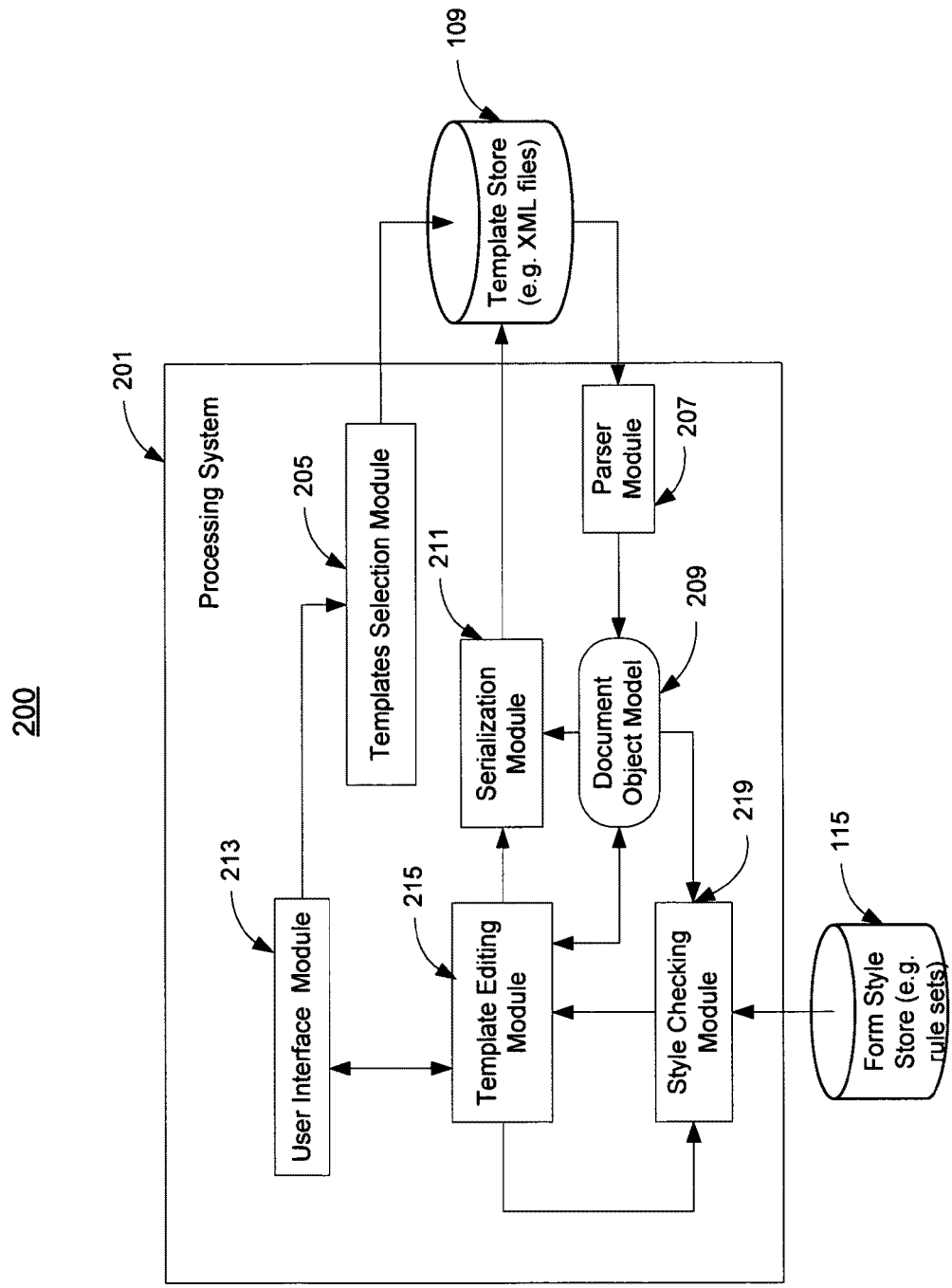
FIG. 2 is a block diagram illustrating one embodiment of a system that adapts form templates.

FIG. 2 is a block diagram illustrating one embodiment of a system that adapts form templates. System 200 may include a template store 109 and a form style store 115 as in system 100 of FIG. 1. In certain embodiments, processing system 201 may include modules executable as part of a form adaptation module 117 in processing system 101 of FIG. 1. In one embodiment, a form template may be retrieved from a template store 109 based on a template selection module 205 to accommodate different business scenarios. A template selection module 205 may determine selections of one or more form templates according to a business scenario specified from a user via a user interface module 213. For example, a user may select form templates as purchase order forms, a group of inbound letter forms or a group of outbound letter forms. A form template may be stored as a text file in a markup language, such an XML file. In one embodiment, a retrieved form template is sent to a parser module 207 which parses the retrieved form template into a data structure as a document object model 209, such as a tree structure in Java DOM (Document Object Model) including tree nodes associated with rendering attributes from the retrieved form template. A tree node in a document object model 209 may be associated with a form content, such as a partition of a form or a building block of a form.

In one embodiment, a template editing module 215 updates a document object module 209 via a user interface module 213. A document object model may be updated by, for example, reorganizing parts of the tree structure of the document object model (such as deleting a tree node, adding a tree node, changing the order of child nodes of a tree node, etc.) or setting new values for the associated attributes. A style checking module 219 may retrieve a form style, which may include constraints on rendering attributes of the document object model 209, from a form style store 115. In one embodiment, a style checking selects form styles according to attributes included in a document object model 209, such as, for example, the name of an associated vendor. A style checking module 219 may determine if any of constraints in selected form styles for a document object model 209 is violated, such as, for example, mismatched font size for an address building block corresponding to a tree node in the document object model 209. When a style violation or constraint violation is detected, in one embodiment, a style checking module 219 may report the detected violation to a template editing module 215 for presenting to a user via a user interface module 213.

In another embodiment, a template editing module 215 may determine causes of a constraint violation detected to update a document object model 209 accordingly for removing the detected constraint violation. A serialization module 211 may generate a file from a document object model 209 or serialize a document object model 209 into the generated file, such as an XML file, to be stored in a template store 109. Particularly, an XML file generated by a serialization module 211 from a document object model 209 may be parsed into the same document object model 209 by a parser module 207.

Figure 3:
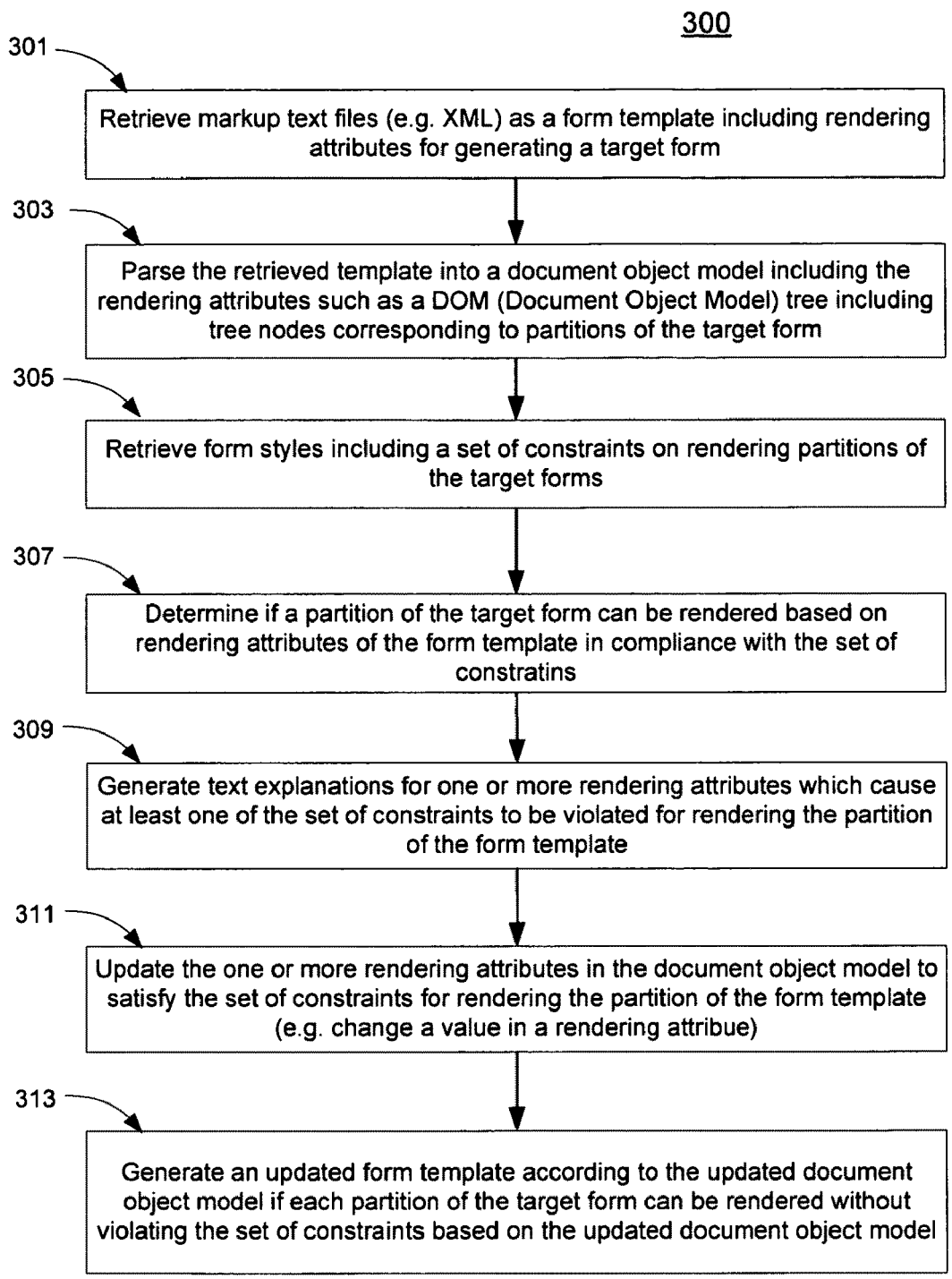
FIG. 3 is a flow diagram illustrating one embodiment of a process for adapting a form template.

FIG. 3 is a flow diagram illustrating one embodiment of a process for adapting a form template. Exemplary process 300 may be performed by a processing logic that may comprise hardware (circuitry, dedicated logic, etc.), software (such as is run on a dedicated machine), or a combination of both. For example, process 300 may be performed by some components of system 200 of FIG. 2. In one embodiment, the processing logic of process 300 may retrieve form templates as files in a markup language at block 301, such as XML files from a template store 109 of FIG. 2. A form template may include XML tags specifying a partition of a form, such as a subform, an address block, a text field, a caption, or a table etc. Additionally, a form template may include rendering attributes specifying how a target form should be rendered. For example, a form template may include an XML tag associated with a font with a typeface attribute having a value "Arial" and a size attribute having a value "14". The XML tag associated with a font may be enclosed by another XML tag associated with a form field to specify the corresponding form field in the target form to be rendered using "Arial" typeface font with size "14". In one embodiment, semantics of a form template may be interpreted inside a form generator, such as a form generator module 105 of FIG. 1 to drive how a target form should be rendered or laid out based on the form template.

At block 303, the processing logic of process 300 may parse the retrieved form template into a data structure which could be updated to make changes in the corresponding target form. In one embodiment, the data structure may be a document object model (DOM) as a tree including tree nodes corresponding to partitions or building blocks of a target form and one or more rendering attributes for the target form. A partition of a form may correspond to a physical region of the form, such as a table of listed items ordered with names, prices and quantities. The processing logic of process 300 may retrieve form styles from a form style storage such as form style storage 115 of FIG. 2. A form style may include a plurality of constraints for rendering a target form. Each constraint may be specified as one or more rules or conditions on rendering attributes for a target form. For example, a constraint may specify two separate building blocks of a form should have an identical width or a table of the form should be rendered using a certain font size, etc. Different form styles may be applicable for different types of forms. In one embodiment, the processing logic of process 300 may select form styles according to one or more attributes in a form template based on a corresponding document object model. In another embodiment, particular form styles may be selected by a user request.

At block 307, according to one embodiment, the processing logic of process 300 may determine if a partition or a part of a target form could be rendered based on a form template in compliance with a set of constraints included in a form style. The processing logic of process 300 may traverse a document object model parsed from a form template such as, for example, from top down following a tree structure. The processing logic of process 300 may determine whether rendering attributes associated with a tree node corresponding to a partition of a form satisfy the set of constraints by traversing a document object model to identify and compare related rendering attributes.

In one embodiment, the processing logic of process 300 may search through a document object model to collect a plurality of tree nodes corresponding to separate partitions of a target form to compare corresponding rendering attributes according to constraints including specifications of a relationship among the rendering attributes. Whether a constraint is satisfied or not may be determined by matching a value of a rendering attribute, such as width of a text field in a form to a value or range of values specified in the constraint. The processing logic of process 300 may perform a spatial inference to determine if constraints can be satisfied among a plurality of rendering attributes. For example, a page size, left and right margin sizes, alignment relationships of existing constraints and/or rendering attributes may determine an allowable width of a building block, even though such a constraint is not explicated included in the corresponding form style.

If it is determined that a partition of a form cannot be rendered based on a form template including rendering attributes for the partition without violating at least one of constraints from a form template, in one embodiment, the processing logic of process 300 may generate text explanations including the reason why a constraint violation occurs at block 309. A linkage to references of the corresponding rendering attributes and the violated constraints may be provided when the text explanations are generated. In one embodiment, the processing logic of process 300 may present the generated text explanation to a user interface including highlights of tree nodes in a document object model associated with the partition of the target form to be rendered.

At block 311, in one embodiment, the processing logic of process 300 may update a document object model, such as changing values of one or more rendering attributes to remove a constraint violation identified from block 307. An update on a rendering attribute may be a change of a value of an associated value to match a constraint value. In some embodiments, the processing logic of process 300 may update a rendering attribute for a plurality of document object models corresponding to a group of form templates at the same time. The processing logic of process 300 may determine to generate a user interface for a user to perform manual update to remove a constraint violation, for example, when the constraint violation cannot be removed automatically or when a user requests manual updates. In one embodiment, at block 313, the processing logic of process 300 serialize an updated document object model into an updated form template, e.g. an updated XML file, to be stored back in to a form template storage, such as form template store 109 of FIG. 2. To preserve a current state of a document object model, the processing logic of process 300 may periodically perform serialization of the document object model to a temporary storage area.

Figure 4:
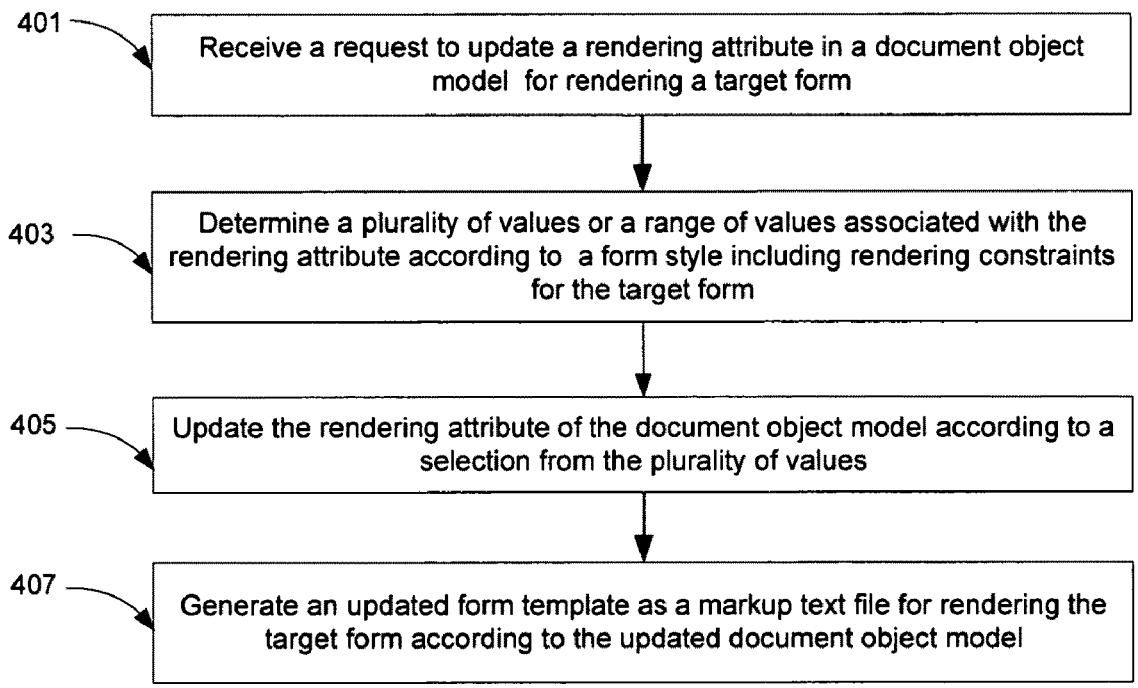
FIG. 4 is a flow diagram illustrating one embodiment of a process for updating an attribute for a form template.

FIG. 4 is a flow diagram illustrating one embodiment of a process for updating r a form template. Exemplary process 400 may be performed by a processing logic that may comprise hardware (circuitry, dedicated logic, etc.), software (such as is run on a dedicated machine), or a combination of both. For example, process 400 may be performed by some components of system 200 of FIG. 2. The processing logic of process 400 may receive a request to update a rendering attribute in a document object model, such as document object model 209 of FIG. 2. In one embodiment, a request for updating a rendering attribute may be initiated by a user via a user interface including a selection representing a tree node associated with the rendering attribute in a document object model. For example, a tree node may be presented as an associated rendering attribute, such as a font size, which may have been determined to violate a constraint from a form style according to a process performed such by the processing logic of process 300 of FIG. 3. In another embodiment, a tree node may be selected to update an associated attribute value as part of manual tuning for a target form by a user.

At block 403, the processing logic of process 400 may determine for an attribute a plurality of possible values or a range of possible values incompliance with constraints from a form style, such as retrieved from form style store 217 of FIG. 2, for rendering a corresponding target form. In one embodiment, the processing logic of process 400 may retrieve information about available system resources to ensure the plurality of values (or range of values) determined are available when selected. For example, a font size attribute associated with a tree node of a document object model corresponding to a caption block in a target form may be constrained by a maximum size number according to a form style. In this example, the processing logic of process 400 may determine a set of font sizes each is both available from the current system resources and has a value less than the maximum size as constrained.

At block 405, the processing logic of process 400 may update rendering attributes of a document object model according to values selected or specified from the determined set of values or range of values of block 403 via, for example, a user interface from a user. If a document object model does not explicitly include a rendering attribute being updated, the processing logic of process 400 may insert the updated rendering attribute into the document object model. At block 407, in one embodiment, the processing logic of process 400 may generate an updated form template as an updated markup text file, such as an XML file. The updated form template may be stored in a storage, such as template store 203, to be retrieved for rendering a target form in compliance with constraints from corresponding form styles.

Figure 5:
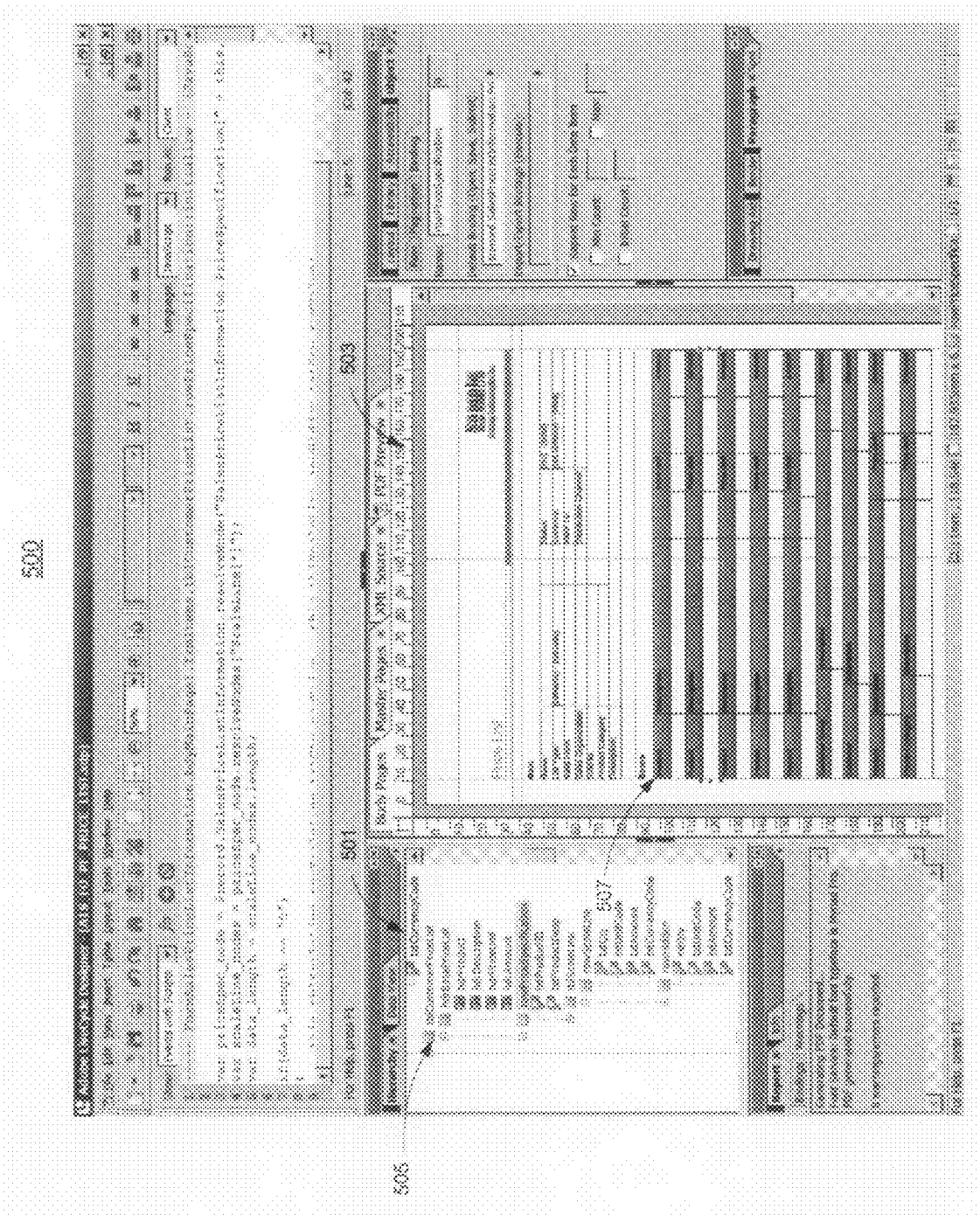
FIG. 5 is an exemplary diagram illustrating different views of a form generated according to a form template.

FIG. 5 is an exemplary diagram illustrating different views of a form generated according to a form template. A sample form 503 rendered (or laid out) as a body page corresponds to a form structure hierarchy 501 including a table component 505 for customer price lists. Sample form 503 includes a partition 507 as a table corresponding to a table component 505. A form template for rendering a form 503 may be parsed into a document object model having a tree structure similar to a form structure hierarchy 501 including a tree node corresponding to a form partition 507.

Figure 6:
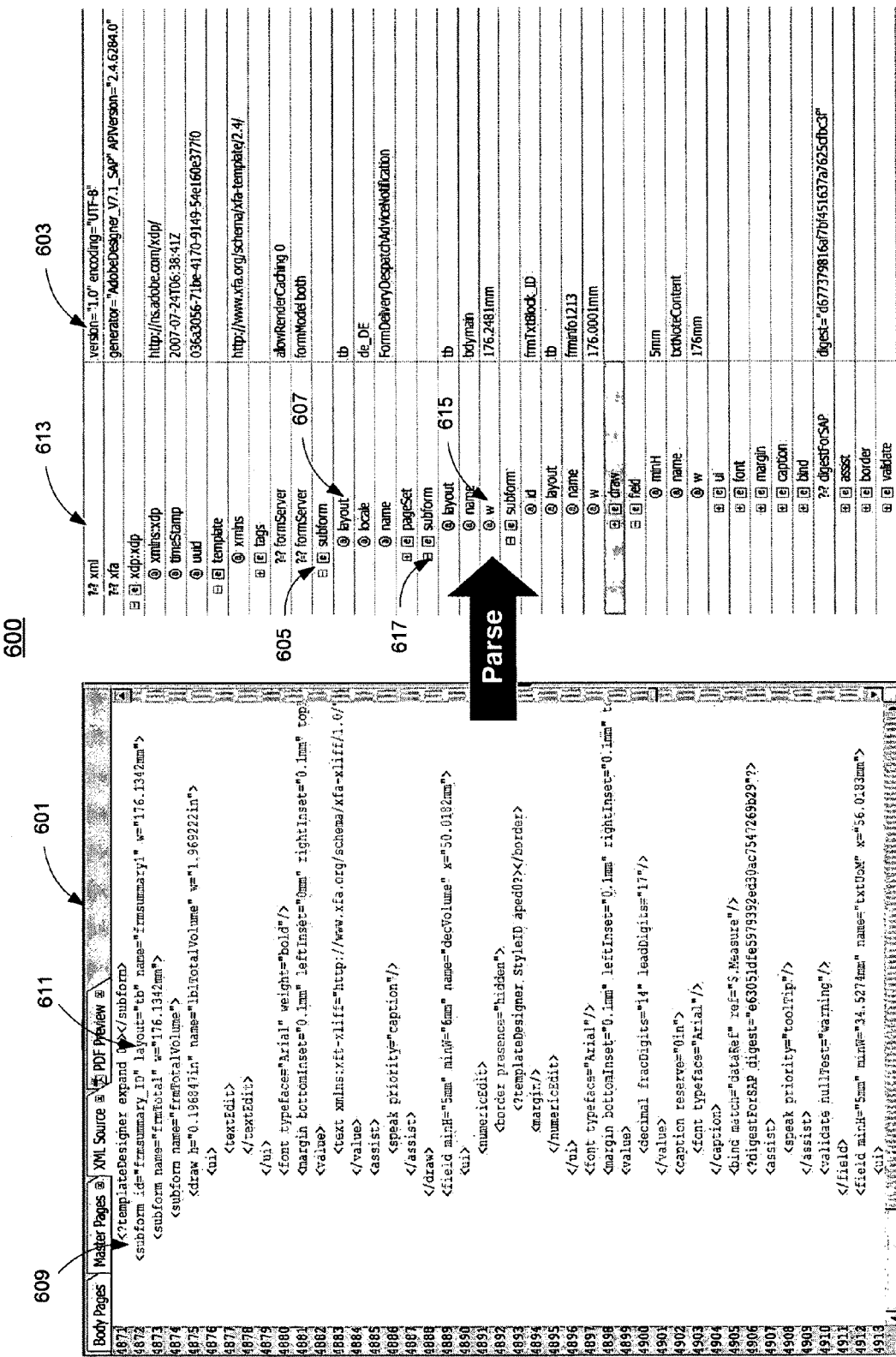
FIG. 6 is an exemplary diagram illustrating a sample form template and a tree view of a document object model parsed from the sample form template.

FIG. 6 is an exemplary diagram illustrating a sample form template and a tree view of a document object model parsed from the sample form template. The sample form template may be an XML file as shown in 601. A tag in the sample form template may correspond to a partition of a target form such as a tag "subform" 609. Rendering attributes associated with a partition of the target form corresponding to a tag "subform" 609 includes an attribute named "layout" with a value "tb" 611 which may instruct a form layout engine, such as form generator module 105 of FIG. 1 to layout the corresponding partition with tables. A document object model parsed from the sample form template 601 is illustrated by a hierarchical tree structure 613 associated with corresponding attributes 603. Note that each tree node in the tree structure 613 may be a tag node, such as node 605 or an attribute node, such as node 607. A tag node, such as node 605, may correspond to a partition of a target form. An attribute node, such as node 615, may be associated with a rendering attribute for a tag node 617 corresponding to a partition of a target form.

Figure 7A:
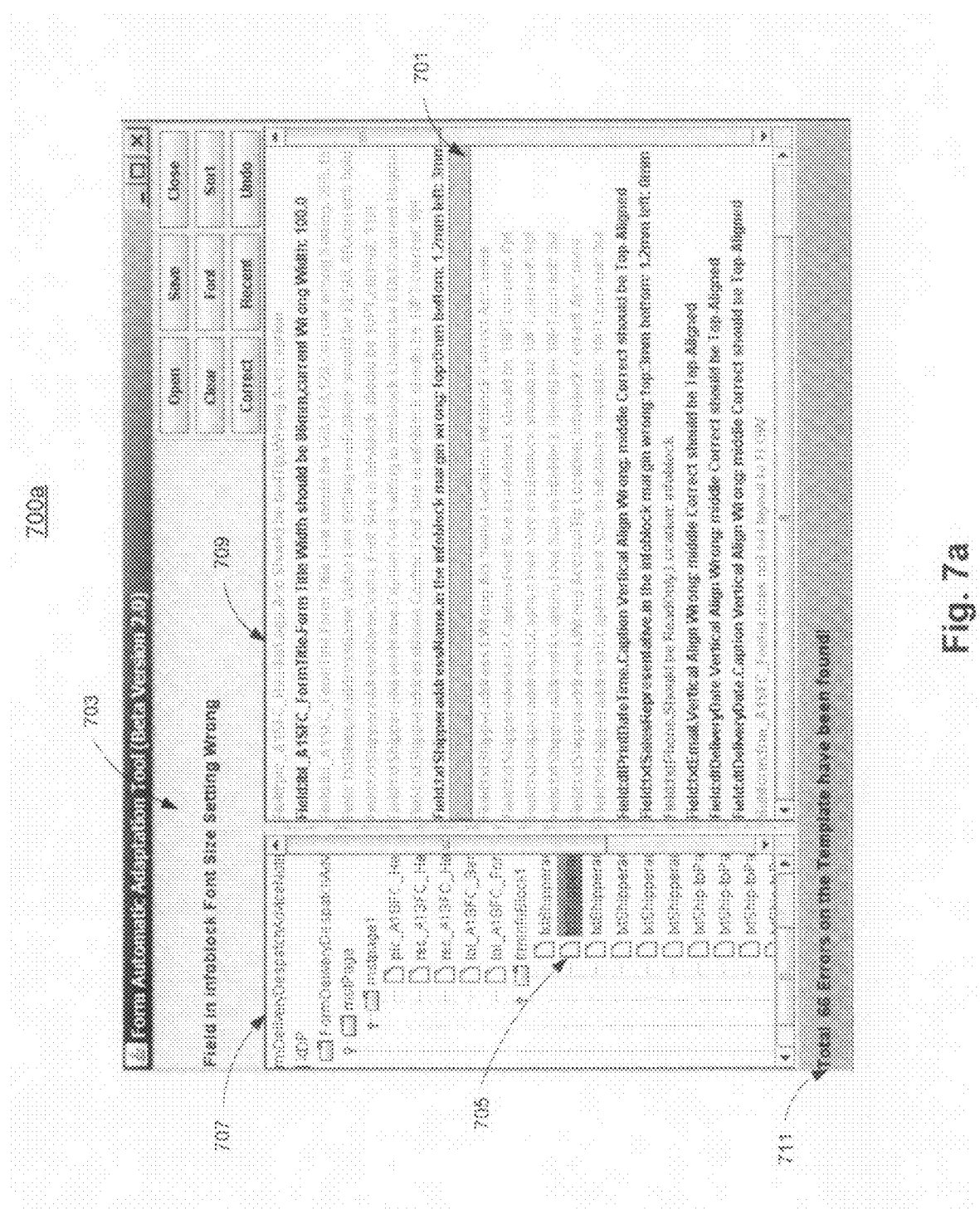
FIGS. 7a-7h are user interface diagrams illustrating exemplary interfaces with one embodiment of adapting a form template.

FIGS. 7*a*-7*h* are user interface diagrams illustrating exemplary interfaces with one embodiment of adapting a form template. In one embodiment, user interfaces illustrated in FIGS. 7*a*-7*h* may be presented according to system 200 of FIG. 2. Referring to FIG. 7*a*, user interface 700*a* includes a document object window 707, a list window 709, an explanation window 703, and a status window 711. Document object window 707 presents a hierarchical tree associated with a document object model parsed from a form template according to, for example, parser module 207 of FIG. 2. A tree node 705 in document object window 707 may correspond to a partition, such as a text field, of a target form. List window 709 presents a list of error messages indicating how constraints are violated by a form template corresponding to document object window 707 based on a form style, for example, retrieved from form style storage 115 of FIG. 2. In one embodiment, the list of error messages in list window 709 may be generated by a style checking module, such as style checking module 219 of FIG. 2. An error message in list window 709 may be associated with a rendering attribute of the form template corresponding to document object window 707. In one example, when an error message 701 is selected in list window 709, a tree node 705 associated with a rendering attribute for the error message 701 may be highlighted automatically in document object window 707. In addition, an explanation text corresponding to the selected error message 701 may be shown in explanation window 703. A summary of all errors identified from the form template associated with document object window 707 may be presented in status window 711.

Figure 7B:
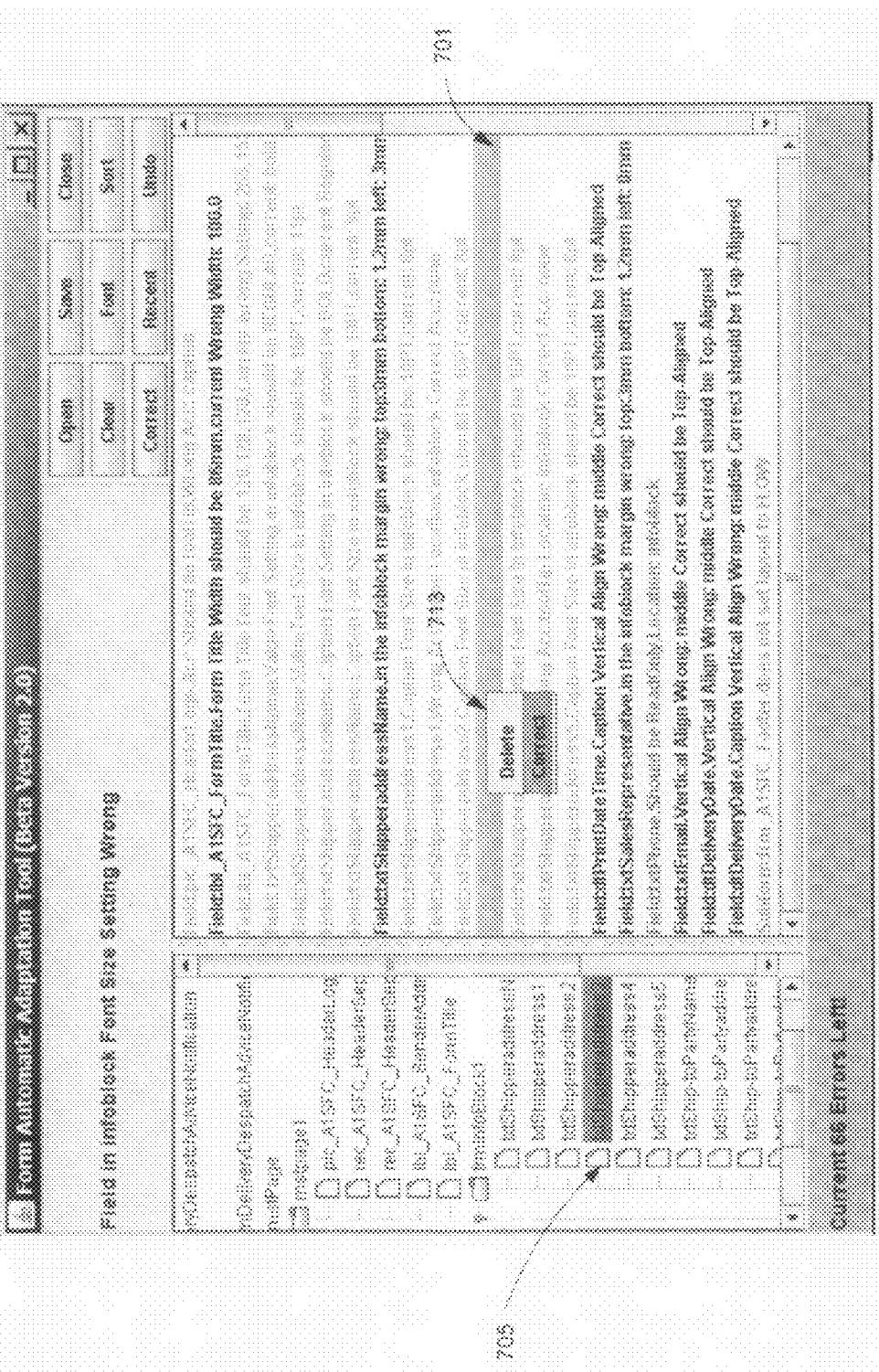
Figure 7C:
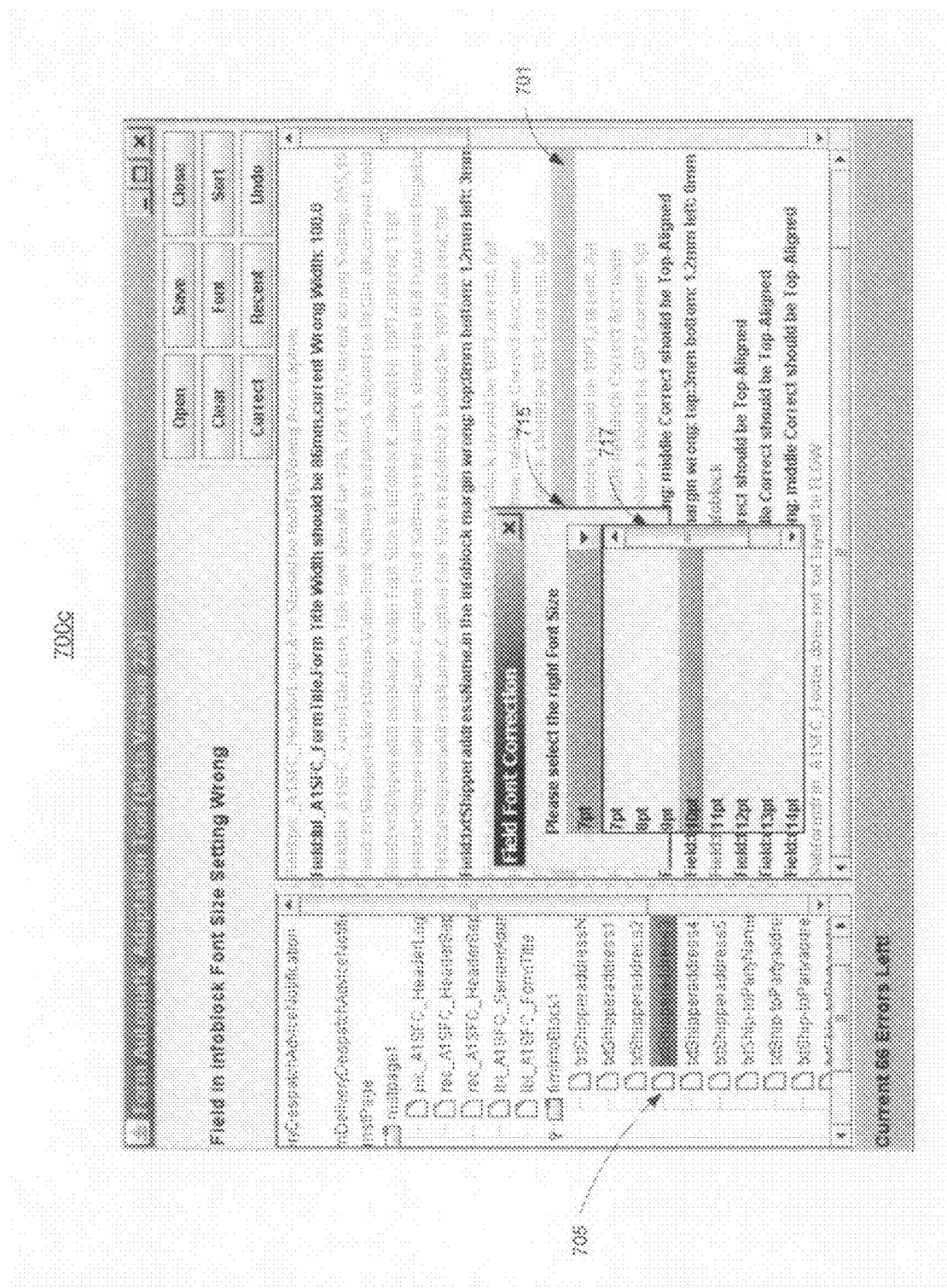
Figure 7D:
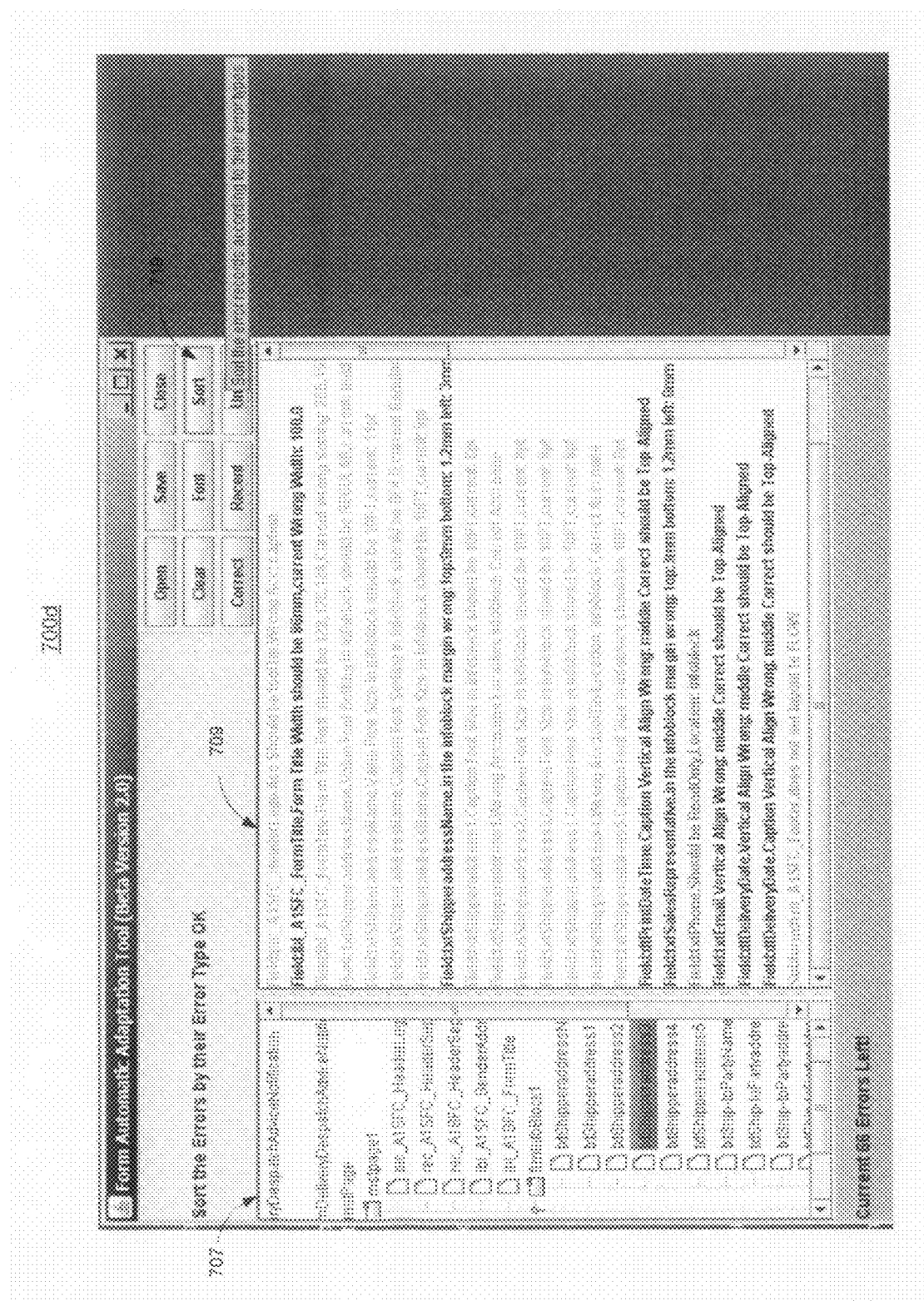

Referring to FIG. 7*b*, when an error message 701 is selected, in one embodiment, a pop up form 713 may be presented in place to guide a user to perform possible actions to correct or delete the corresponding error. In one embodiment, when an error message is deleted, a rendering attribute corresponding to the error message is removed from a document object model, for example, by template editing module 215 of FIG. 2. In another embodiment, deleting an error message may cause a corresponding constraint from a form style to be disabled, for example, by style checking module 219 of FIG. 2. Referring to FIG. 7*c*, if correcting an error message is selected for an error message 701, pop up forms including possible values for a rendering attribute may be presented, such as form 715 and form 718. In one embodiment, forms 715 and 718 are generated according to process 400 of FIG. 4. Turning now to FIG. 7*d*, a list window 715 presents error messages in a sorted manner. In one embodiment, error messages in list window 715 are sorted according to a user request via a button 719.

Figure 7E:
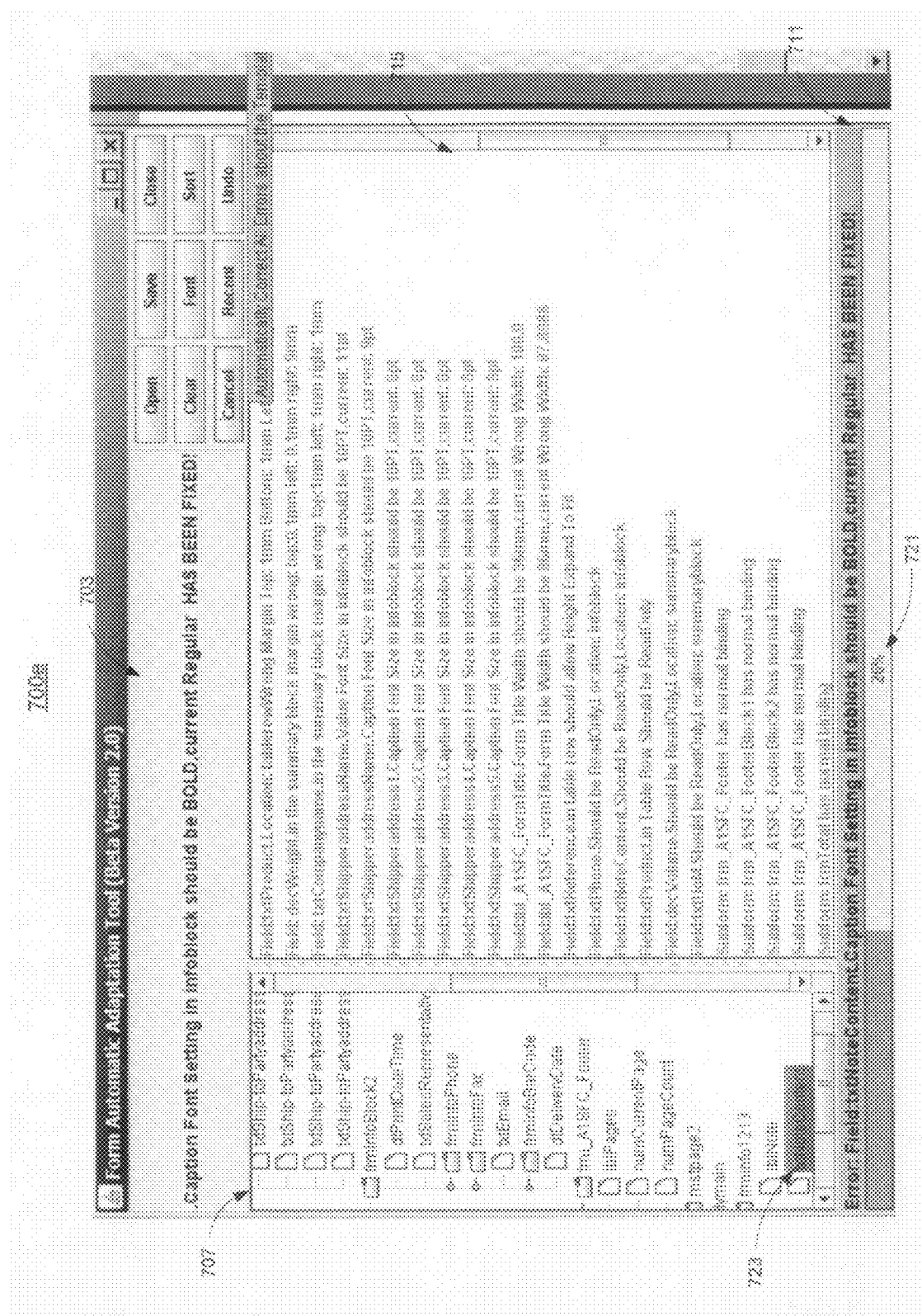

FIG. 7*e* illustrates a user interface 700*e* for automatic corrections of errors identified in a form template. In one embodiment, automatic corrections of errors may be performed according to process 300 of FIG. 3. A list window 715 in user interface 700*e* may highlight an error message for an error currently being corrected. A tree node 723 corresponding to a form partition associated with the current error may also be highlighted at the same time in a document object window 707 during the progress of error correction. In the meanwhile, status window 711 may display which error has just been fixed with corresponding explanations presented in an explanation window 703. Additionally, a progress window 721 may report a summary of how many errors have currently been corrected among all the errors identified as shown in a list window 715.

Figure 7F:
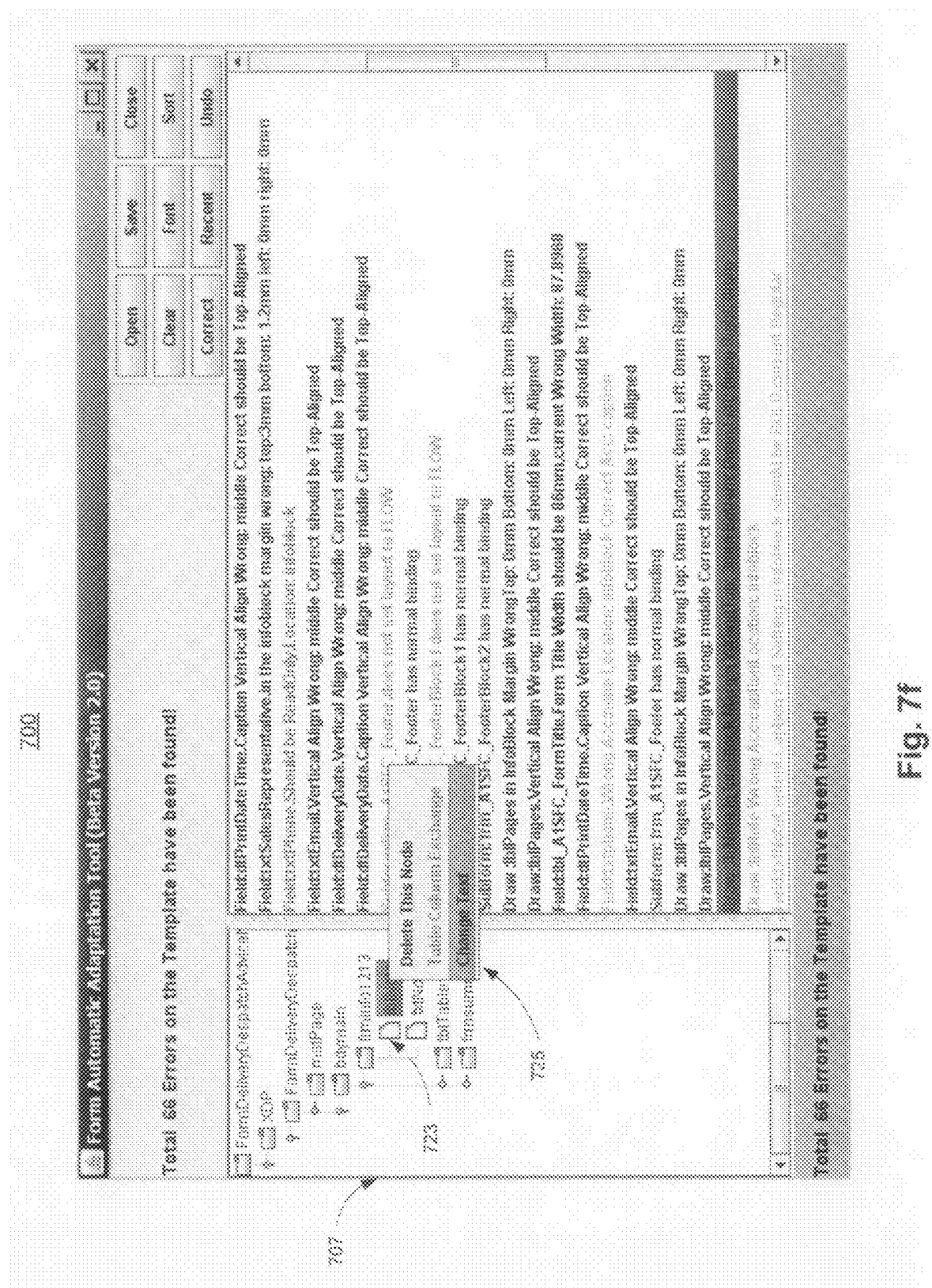
Figure 7G:
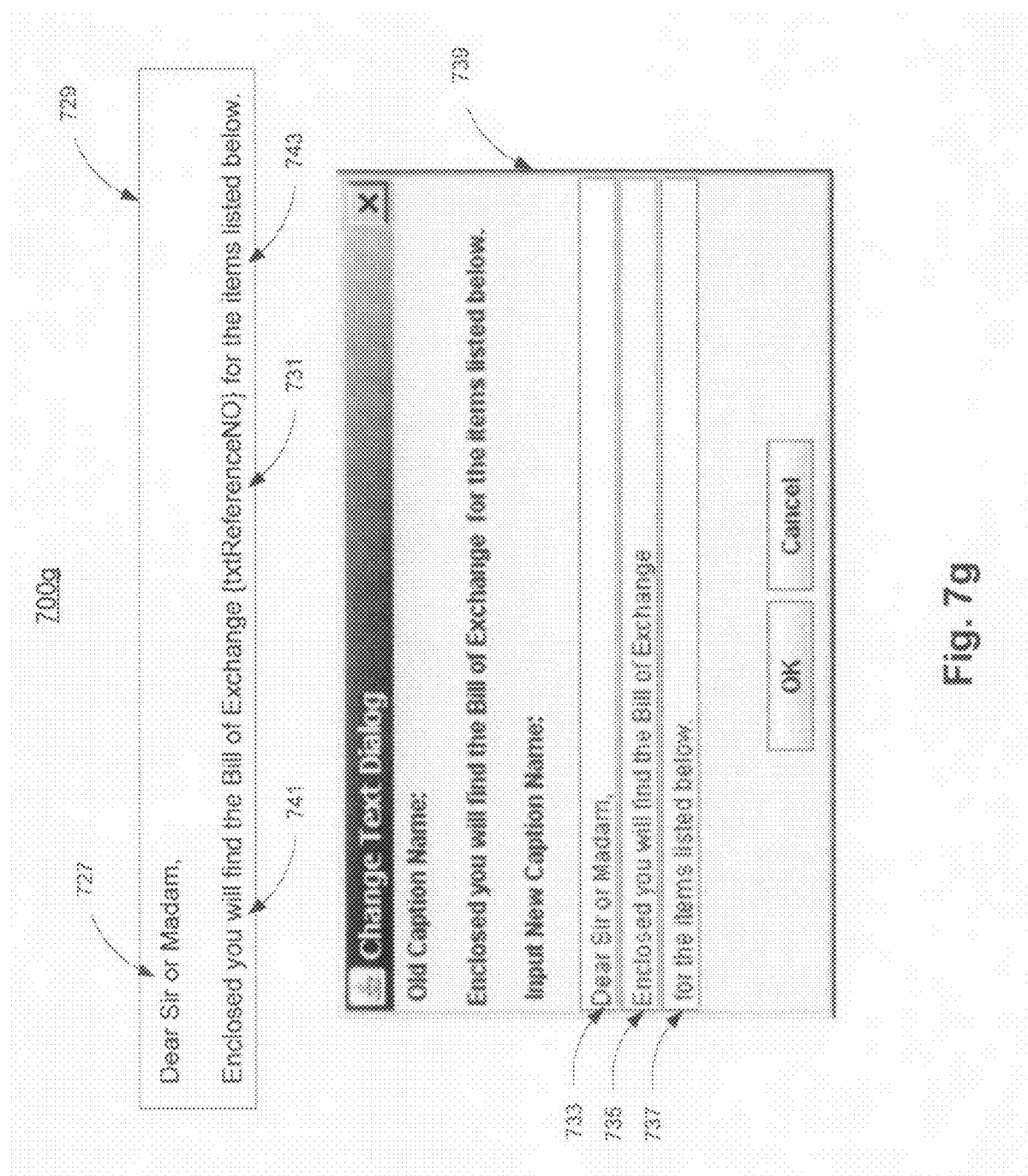

Turning now to FIG. 7*f*, a user interface diagram 700*h* is illustrated to update a document object model for a form template via a pop up form 725. In one embodiment, a pop up form 725 is generated when a tree node 723 is selected from document object window 707. Tree node 723 may correspond to a partition of a target form, such as a text field in the target form. A pop up form 725 may be generated by an editing module such as template editing module 215 of FIG. 2. In one embodiment, elements presented in a pop up form 725 may be determined according to attributes associated with the selected tree node 723 in the document object model of window 707. In one embodiment, attribute names and/or values may be compared to select a set of predefined form elements to present allowable editing operations, such as "change text" in a pop up form 725. Referring now to FIG. 7*g*, a dialog form 739 including text fields 733, 735 and 737 is presented for receiving text inputs when a "change text" element is selected from a pop up form 725 of FIG. 7*f*. A source text data 729 may be associated with the selected tree node 723 of FIG. 7*f* in a document object model presented in a document object window 707 of FIG. 7*f*. In one embodiment, source text data may be parsed to identify different parts for editing fields in a pop up form, such as, for example, text part 727 for text field 733, text part 741 for text field 735 and text part 743 for text field 737.

Figure 7H:
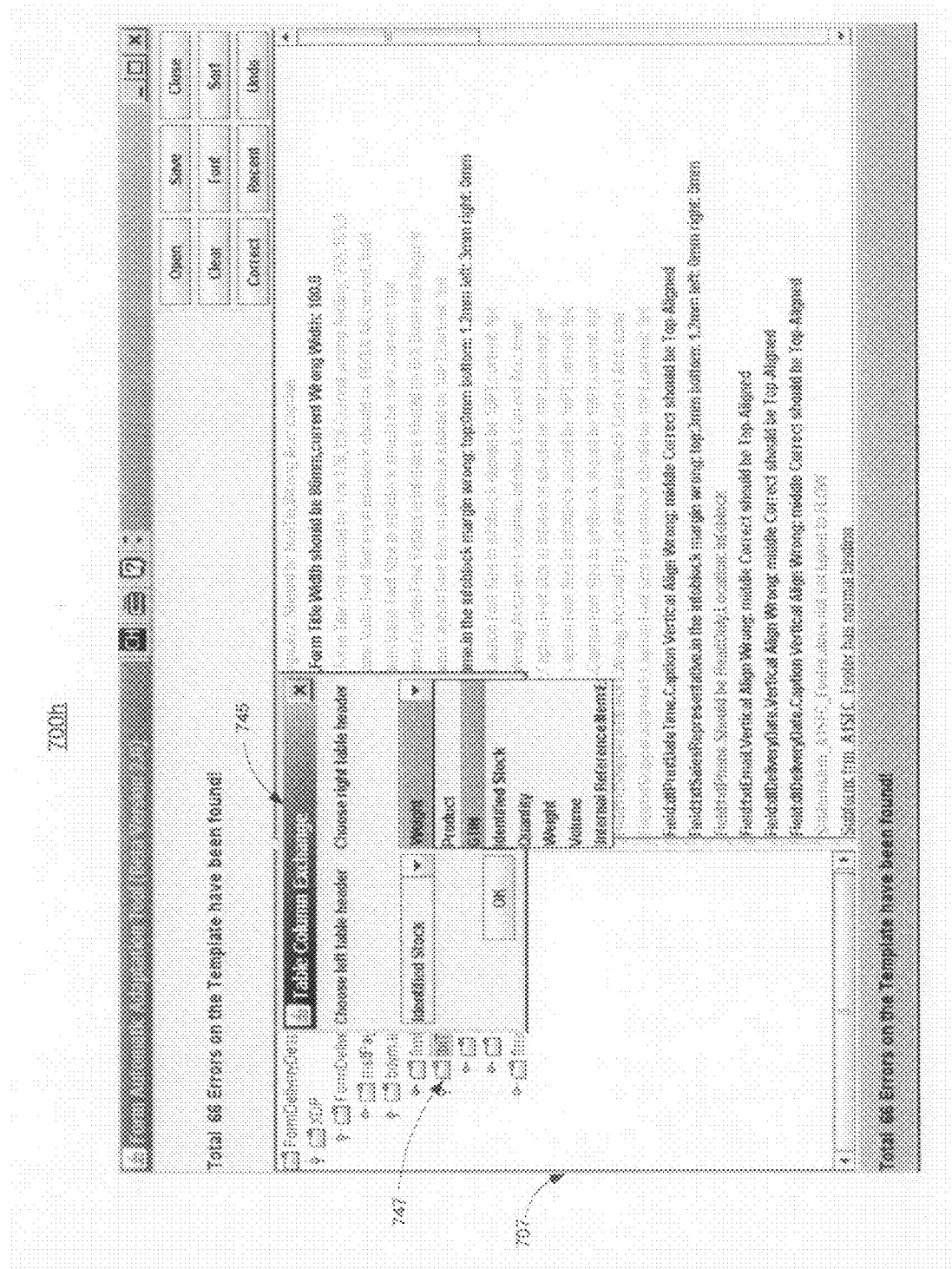

In another embodiment, referring to FIG. 7*h*, when a tree node 743 corresponding to a form table as a partition in a target form is selected from a document object window 707, a pop up form 741 is presented. A structure of the corresponding form table may be edited via a pop up form 741 according to the document object model associated with a document object window 707. In one embodiment, the document object model may be traversed to identify the structure of the form table associated with the selected tree node 747. A structure of a form table may be a set of ordered columns or a set of ordered rows. For example, a pop up form 745 may include selections of columns identified from the document object model associated with a tree node 747. Updating the document object model to exchange table columns associated with a tree node 747 may be possible via a pop up form 745 according to, for example, template editing module 215 of FIG. 2.

FIGS. 8*a*-8*c* are examples of constraints for rendering attributes of a form template. In one embodiment, constraints 800*a*, 800*b* and 800*c* may be included in form styles, for example, as stored in form style storage 115 of FIG. 2. Referring to FIG. 8*a*, a constraint specifies the height of a content component in an address block of a form should be the same as the height of an info block 801. An additional constraint limits the height of an info block of the form to be of 3.0 mm in value 809. Accordingly, in one embodiment, a style checking module, such as style checking module 219 of FIG. 2 may deduce an implicit constraint on the height of a content component of the address block to be of 3.0 mm in value. Other constraints may include alignment relationships between different partitions of a form, such as table position constraint 803 of FIG. 8b and block alignment constraint 805 of FIG. 8c.

FIG. 9 shows one example of a computer system 901 which may be used to implement an embodiment of the present invention. Note that while FIG. 9 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 9, the computer system 901, which is a type of a data processing system, includes a bus 903 which is coupled to a microprocessor(s) 905 and a ROM (Read Only Memory) 907 and volatile RAM 909 and a non-volatile memory 911. The microprocessor 903 may retrieve the instructions from the memories 907 909 911 and execute the instructions to perform operations described above. The bus 903 interconnects these various components together and also interconnects these components 905, 907, 909, and 911 to a display controller and display device 913 and to peripheral devices such as input/output (I/O) devices which may be mice, keyboards, modems, network interfaces, printers and other devices which are well known in the art. Typically, the input/output devices 915 are coupled to the system through input/output controllers 917. The volatile RAM (Random Access Memory) 909 is typically implemented as dynamic RAM (DRAM) which requires power continually in order to refresh or maintain the data in the memory.

The mass storage 911 is typically a magnetic hard drive or a magnetic optical drive or an optical drive or a DVD RAM or other types of memory systems which maintain data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine"(e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In addition, the operations described above may be performed by an apparatus. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not specifically related to a particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the scope of the invention

What is claimed is:

1. A method comprising:
    retrieving a form template including one or more rendering attributes for rendering one or more partitions of a form;
    determining if the one or more partitions of the form can be rendered in compliance with one or more style constraints according to the one or more rendering attributes;
    generating a page including a first window and a second window, the first window including an error message indicating at least one of the rendering attributes do not satisfy the one or more style constraints, the second window including an explanation of the error message;
    updating the at least one of the rendering attributes of the form template to comply with the one or more style constraints, when the error message is selected at the generated page; and
    generating an updated form template in accordance with the updated the at least one of the rendering attributes to enable the one or more partitions of the form to be rendered based on the updated template in compliance with the one or more style constraints, wherein the generated page includes the first window, the second window, a third window, and a fourth window, wherein the third window includes the form template parsed into a hierarchical tree structure representative of a document object model, wherein the forth window includes a summary of error messages, and wherein when the error message is selected at the first window, the second window provides the explanation of the selected error message.

2. The method of claim 1, wherein the one or more rendering attributes include a first rendering attribute having a first rendering value and a second rendering attribute having a second rendering value, and wherein the determination comprises:
    determining a rendering value for the first rendering attribute according to the second rendering value and one of the one or more style constraints; and
    comparing the rendering value with the first rendering value.

3. The method of claim 1, wherein the form template is a structured text document in a markup language including one or more form components corresponding to one or more partitions of the form.

4. The method of claim 3, wherein the user interface includes a tree representing a document object model of the structured text document, wherein the tree includes one or more tree nodes corresponding to the one or more form components, and wherein the at least one of the one or more rendering attributes are associated with one of the one or more tree nodes.

5. The method of claim 4, wherein the user interface includes a pop up form associated with the one of the one or more tree nodes, and wherein the at least one of the one or more rendering attributes are updated according to the pop up form.

6. The method of claim 5, wherein the error message is associated with a link which activates the pop up form including a selection of a plurality of rendering values, wherein the presentation comprises:
    determining the plurality of rendering values such that each of the plurality of rendering values for the at least one of the one or more rendering attributes is in compliance with the plurality of style constraints.

7. The method of claim 4, wherein the one or more partitions of the form include a table having a plurality of columns and wherein the one of the one or more tree nodes corresponds to the table.

8. The method of claim 7, wherein the one of the one or more tree nodes includes a link, wherein the user interface includes a pop up form including an order of a list of values corresponding to the plurality of columns in the table, and wherein the link activates the pop up form to update the order.

9. The method of claim 4, wherein the user interface further includes a list of messages including the error message, wherein the tree and the list belong to separate windows in the user interface, and wherein the one of the one or more tree nodes is highlighted.

10. A machine-readable storage medium having instructions therein, which when executed by a machine, causes the machine to perform a method, the method comprising:
    retrieving a form template including one or more rendering attributes for rendering one or more partitions of a form;
    determining if the one or more partitions of the form can be rendered in compliance with one or more style constraints according to the one or more rendering attributes;
    generating a page including a first window and a second window, the first window including an error message indicating at least one of the rendering attributes do not satisfy the one or more style constraints, the second window including an explanation of the error message;
    updating the at least one of the rendering attributes of the form template to comply with the one or more style constraints, when the error message is selected at the generated page; and
    generating an updated form template in accordance with the updated the at least one of the rendering attributes to enable he one or more partitions of the form to be rendered based on the updated template in compliance with the one or more style constraints, wherein the generated page includes the first window, the second window, a third window, and a fourth window, wherein the third window includes the form template parsed into a hierarchical tree structure representative of a document object model, wherein the forth window includes a summary of error messages, and wherein when the error message is selected at the first window, the second window provides the explanation of the selected error message.

11. The machine-readable storage medium of claim 10, wherein the one or more rendering attributes include a first rendering attribute having a first rendering value and a second rendering attribute having a second rendering value, and wherein the determination comprises:
   determining a rendering value for the first rendering attribute according to the second rendering value and one of the one or more style constraints; and comparing the rendering value with the first rendering value.

12. The machine-readable storage medium of claim 10, wherein the form template is a structured text document in a markup language including one or more form components corresponding to one or more partitions of the form.

13. The machine-readable storage medium of claim 12, wherein the user interface includes a tree representing a document object model of the structured text document, wherein the tree includes one or more tree nodes corresponding to the one or more form components, and wherein the at least one of the one or more rendering attributes are associated with one of the one or more tree nodes.

14. The machine-readable storage medium of claim 13, wherein the user interface includes a pop up form associated with the one of the one or more tree nodes, and wherein the at least one of the one or more rendering attributes are updated according to the pop up form.

15. The machine-readable storage medium of claim 14, wherein the error message is associated with a link which activates the pop up form including a selection of a plurality of rendering values, wherein the presentation comprises:
   determining the plurality of rendering values such that each of the plurality of rendering values for the at least one of the one or more rendering attributes is in compliance with the plurality of style constraints.

16. The machine-readable storage medium of claim 13, wherein the one or more partitions of the form include a table having a plurality of columns and wherein the one of the one or more tree nodes corresponds to the table.

17. The machine-readable storage medium of claim 16, wherein the one of the one or more tree nodes includes a link, wherein the user interface includes a pop up form including an order of a list of values corresponding to the plurality of columns in the table, and where the link activates the pop up form to update the order.

18. An apparatus comprising:
   at least one processor; and
   at least one memory including code which when executed enables the apparatus to provide operations comprising:
   retrieving a form template including one or more rendering attribute for rendering one or more partitions of a form;
   determining if the one or more partitions of the form can be rendered in compliance with one or more style constraints according to the one or more rendering attributes;
   generating a page including a first window and a second window, the first window including an error message indicating at least one of the rendering attributes do not satisfy the one or more style constraints, the second window including an explanation of the error message;
   updating the at least one of the rendering attributes of the form template to comply with the one or more style constraints, when the error message is selected at the generated page; and
   generating an updated form template in accordance with the updated the at least one of the rendering attributes to enable the one or more partitions of the form to be rendered based on the updated template in compliance with the one or more style constraints, wherein the generated page includes the first window, the second window, a third window, and a fourth window, wherein the third window includes the form template parsed into a hierarchical tree structure representative of a document object model, wherein the forth window includes a summary of error messages, and wherein when the error message is selected at the first window, the second window provides the explanation of the selected error message.

* * * * *